Patented Jan. 8, 1946

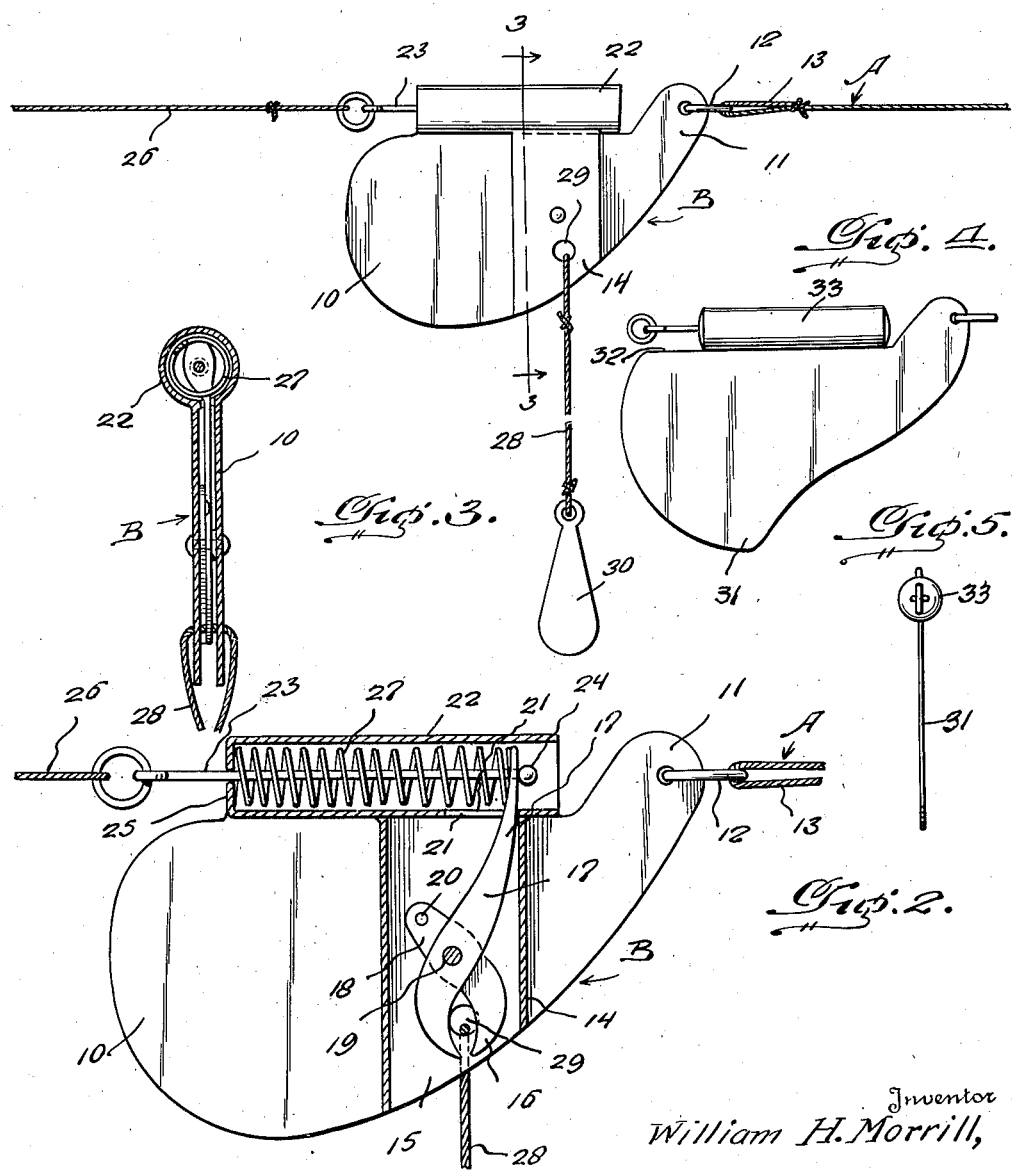

2,392,335

UNITED STATES PATENT OFFICE 2,392,335

FISHING TACKLE

William H. Morrill, Bangor, Maine

Application August 30, 1944, Serial No. 551,892

3 Claims. (Cl. 43—30)

The invention relates to a fishing device, and more especially to a fishing tackle.

The primary object of the invention is the provision of a fishing tackle of this character, wherein a rudder maintains the fishing line straight and avoids twisting thereof while trolling, and when a fish is caught the hook will be subjected to a shock absorbing action, so that there will be a tendency of keeping the hook from tearing out of the mouth of the fish.

Another object of the invention is the provision of a fishing tackle of this character, wherein the sinker carried thereby can be cut loose therefrom when the occasion requires, and in this manner affording the caught fish a better chance to fight and resultant greater sport to a fisherman.

A further object of the invention is the provision of a fishing tackle of this character, wherein the construction thereof is novel and unique, it being automatic in the working thereof for the purposes heretofore mentioned.

A still further object of the invention is the provision of a fishing tackle of this character, which is simple in construction, thoroughly reliable and efficient in operation, strong, durable, light in weight, compact, neat in appearance, and inexpensive in the manufacture thereof.

With these and other objects in view the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a side elevation of the fishing tackle constructed in accordance with the invention.

Figure 2 is a similar view showing portions thereof broken away for exhibiting detail adjuncts.

Figure 3 is a sectional view taken on the line 3—3 of Figure 1 looking in the direction of the arrows.

Similar reference characters indicate corresponding parts throughout the several views in the drawing.

Referring to the drawing in detail A desigates generally a portion of the troll line with which is associated the fishing tackle constituting the present invention and denoted in its entirety at B, as hereinafter fully described.

The fishing tackle B comprises a fin or blade 10 forming a guide rudder, which at the smaller end is provided with an upwardly directed ear 11 having loosely engaged therein a coupling ring 12 with which the loop end 13 of the line A is attached, as best seen in Figures 1 and 2 of the drawing.

A part of this fin or blade 10 is an upstanding housing 14 forming a cavity 15 for accommodating a double jaw cutter or shears 16, the shanks 17 and 18, respectively, of its jaws being crossed and pivoted at 19 in the said housing 14. The shank 18 is fixed at 20 to the housing, while the shank 17 is extended through a clearance 21 therefor opening into a cylinder 22 built with the fin or blade 10 at its top or uppermost edge. The shank 18 has loose connection within the cylinder 22 with a connecting rod 23, as at 24, and this rod 23 freely works through the closed end 25 of the said cylinder remote from the line A. The rod 23 carries the hook and bait line, a portion of the latter being denoted at 26. The rod 23 is held under tension by a coiled spring 27 confined within the cylinder 22 and active against the shank 17 at the connection 24. This spring normally holds the cutter or shears open and against cutting action upon the sinker tie 28, which is looped through an eye or hole 29 in the fin or blade 10 close to the lowermost edge thereof and intersecting the cavity 15 created by the housing 14 for the cutter or shears 16, the sinker 30 being suspended by the said tie, as is usual.

Now, when excessive strain is placed upon the hook and bait line 26 the spring sets up a shock absorbing activity thereon, and the cutter or shears 16 will be automatically operated for the severing or cutting of the sinker tie 26, thereby removing or releasing the sinker 30 from the fishing tackle B, the rubber 10 being for the purpose of maintaining the troll line A against twisting, while the cutter or shears is to release the sinker from the tackle B.

In Figures 4 and 5 of the drawing there is shown a slight modification of the invention, wherein the rudder 31 is preferably of the shape shown, and at the top straight edge 32 thereof is formed a cylinder 33 for housing the spring shown in Figures 2 and 3, functioning for shock absorbing purposes between the troll line and the bait and hook line, respectively, there being no cutter or shears present in this modified form of construction.

What is claimed is:

1. A fishing tackle of the kind described, comprising a blade-like rudder, a connector at one end of the rudder for attachment thereto of a troll line, a double-jaw cutter on the rudder, a sinker hanger engaged with the rudder for severance by said cutter when operated, and a tensioned hook and bait line supported by the rudder and connected with the cutter for operation of the latter when the said hook and bait line is subjected to strain.

2. A fishing tackle of the kind described, comprising a blade forming a rudder, a cutter carried by said rudder, a sinker connected with the rudder and released by the cutter when operated, and a hook and bait line connected to the cutter for operating the same when the hook and bait are subjected to a strain.

3. A fishing tackle of the kind described, comprising a blade forming a rudder, a cutter carried by the rudder, a sinker connected to the rudder and released by the cutter, a hook and bait line connected to the cutter, means for tensioning the connection between the hook and cutter and normally maintaining the latter against cutting operation, and means for enclosing the tensioning means and forming a part of the rudder.

WILLIAM H. MORRILL.